(12) United States Patent
Sato et al.

(10) Patent No.: US 11,912,051 B2
(45) Date of Patent: Feb. 27, 2024

(54) INK JET METHOD AND INK JET APPARATUS

(71) Applicant: Seiko Epson Corporation, Tokyo (JP)

(72) Inventors: Chigusa Sato, Matsumoto (JP); Kyohei Tanaka, Matsumoto (JP); Haruya Koyama, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 133 days.

(21) Appl. No.: 17/560,331

(22) Filed: Dec. 23, 2021

(65) Prior Publication Data

US 2022/0203739 A1 Jun. 30, 2022

(30) Foreign Application Priority Data

Dec. 25, 2020 (JP) ................. 2020-216421

(51) Int. Cl.
*B41M 5/00* (2006.01)
*B41J 2/21* (2006.01)
(Continued)

(52) U.S. Cl.
CPC .......... *B41M 5/0023* (2013.01); *B41J 2/2107* (2013.01); *C09D 11/037* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312;
(Continued)

(56) References Cited

U.S. PATENT DOCUMENTS

| 9,884,973 B2 | 2/2018 | Okamoto et al. | |
| 2009/0169834 A1* | 7/2009 | Sano | C09D 11/322 |
| | | | 427/256 |

(Continued)

FOREIGN PATENT DOCUMENTS

| CN | 107011737 A | 8/2017 |
| JP | 2015-080921 A | 4/2015 |

(Continued)

*Primary Examiner* — Manish S Shah
(74) *Attorney, Agent, or Firm* — Harness, Dickey & Pierce, P.L.C.

(57) ABSTRACT

An ink jet method includes a step of adhering ink jet compositions containing colorants and polymerizable compounds to be cured with radioactive rays to a recording medium by one printing operation, and the ink jet compositions includes an orange ink composition and a red ink composition.

12 Claims, 1 Drawing Sheet

(51) Int. Cl.
  *C09D 11/322* (2014.01)
  *C09D 11/037* (2014.01)
  *C09D 11/107* (2014.01)
  *C09D 11/108* (2014.01)
  *C09D 11/104* (2014.01)
  *C09D 11/101* (2014.01)

(52) U.S. Cl.
  CPC .......... *C09D 11/101* (2013.01); *C09D 11/104* (2013.01); *C09D 11/107* (2013.01); *C09D 11/108* (2013.01); *C09D 11/322* (2013.01)

(58) Field of Classification Search
  CPC .............. B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | | |
|---|---|---|---|---|
| 2012/0003435 | A1* | 1/2012 | Kameyama | C09D 11/101 522/27 |
| 2012/0274717 | A1* | 11/2012 | Nakano | B41J 2/2107 522/108 |
| 2013/0010039 | A1* | 1/2013 | Kida | B41J 2/2107 522/167 |
| 2015/0275001 | A1* | 10/2015 | Yoda | B41J 11/00 522/64 |
| 2017/0218216 | A1* | 8/2017 | Kubota | B41J 2/01 |
| 2017/0321075 | A1* | 11/2017 | Nakano | B41J 2/2107 |

FOREIGN PATENT DOCUMENTS

| | | |
|---|---|---|
| JP | 2015-147418 A | 8/2015 |
| JP | 2017-177353 A | 10/2017 |

\* cited by examiner

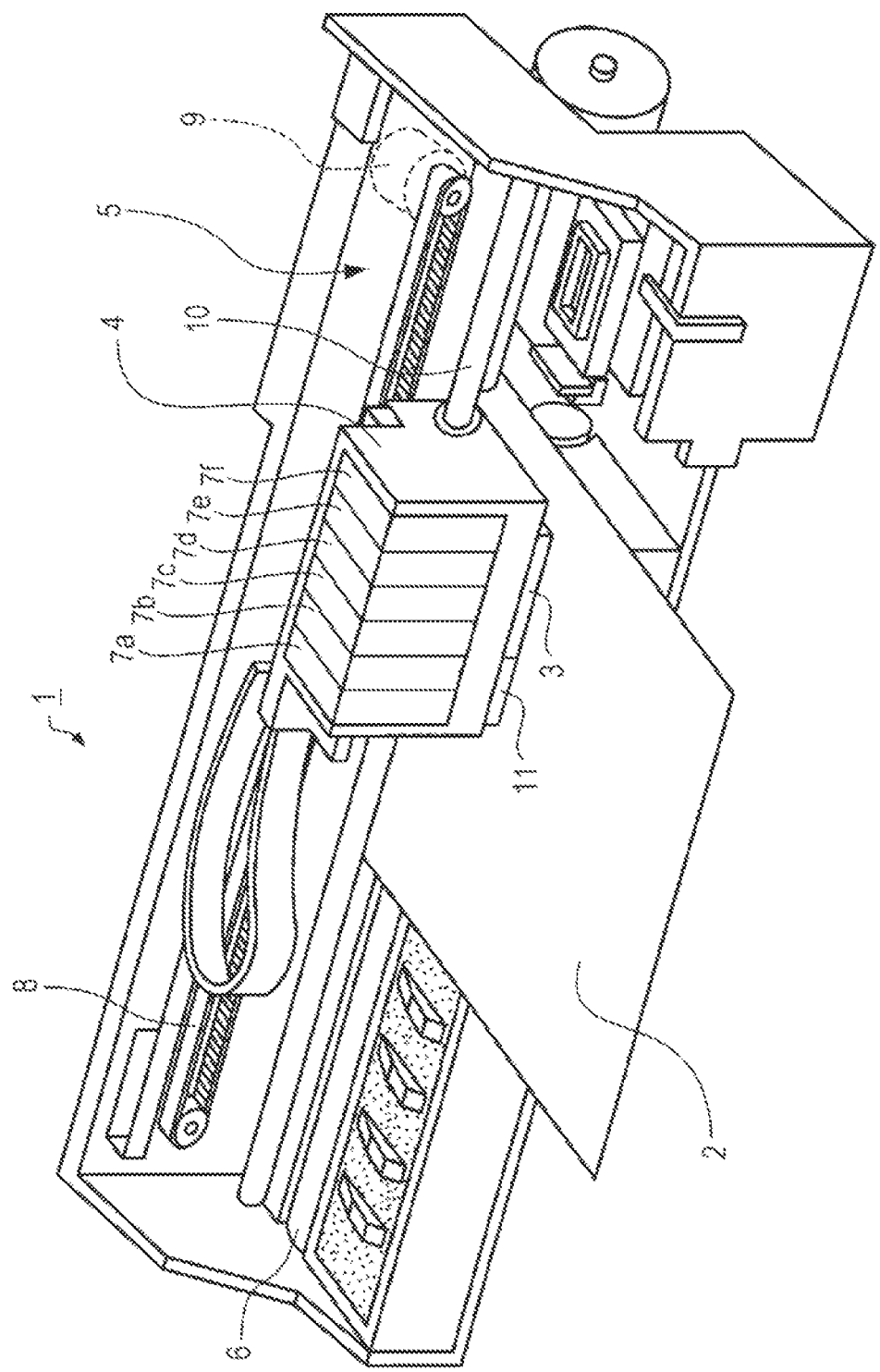

INK JET METHOD AND INK JET APPARATUS

The present application is based on, and claims priority from JP Application Serial Number 2020-216421, filed Dec. 25, 2020, the disclosure of which is hereby incorporated by reference herein in its entirety.

BACKGROUND

1. Technical Field

The present disclosure relates to an ink jet method and an ink jet apparatus.

2. Related Art

Heretofore, an ink jet method to perform printing using a radiation curable ink jet composition has been known. The ink jet method as described above is expected to expand to label applications and signage applications. For example, JP-A-2015-80921 has disclosed a cured film of an active energy ray curable ink jet ink to be used for food package applications.

However, according to the technique disclosed in JP-A-2015-80921, there has been a problem in that in a warm color hue, color reproducibility is difficult to improve. In particular, in the label and signage applications, a high color reproducibility is required from an appealing point of view. In the food package applications, the frequency of use of warm colors specifically tends to be high as compared to that of cold colors. In related techniques, a method to improve the color reproducibility in a warm color hue has not been clearly disclosed. That is, techniques to improve the color reproducibility in a warm color hue have been pursed.

SUMMARY

According to an aspect of the present disclosure, there is provided an ink jet method comprising: a step of adhering ink jet compositions containing colorants and polymerizable compounds to be cured with radioactive rays to a recording medium by one printing operation, and the ink jet compositions described above include an orange ink composition and a red ink composition.

According to another aspect of the present disclosure, there is provided an ink jet apparatus comprising: an ink jet head to eject ink jet compositions containing colorants and polymerizable compounds to be cured with radioactive rays, and the ink jet compositions described above include an orange ink composition and a red ink composition and are adhered to a recording medium by one printing operation.

BRIEF DESCRIPTION OF THE DRAWINGS

FIGURE is a schematic perspective view showing the structure of an ink jet printer according to this embodiment.

DESCRIPTION OF EXEMPLARY EMBODIMENTS

1. Ink Jet Composition

Ink jet compositions used for an ink jet method according to this embodiment will be described. The ink jet compositions of this embodiment contain colorants and polymerizable compounds to be cured with radioactive rays. That is, the ink jet compositions of this embodiment are each a radiation curable ink jet composition.

The radiation curable ink jet composition is cured when being irradiated with radioactive rays to form a cured coating film. As the radioactive rays, for example, ultraviolet rays, electron rays, infrared rays, visible light rays, and X-rays may be mentioned. Among those rays mentioned above, since a material having a preferable curing property at a peak wavelength of radioactive rays and a radiation source therefor are both easily available, ultraviolet rays are preferably used as the radioactive rays. Hereinafter, the radiation curable ink jet composition of this embodiment will be simply called the "ink" in some cases.

In the ink jet method according to this embodiment, a plurality of inks containing different colorants is used. The inks include an orange ink composition and a red ink composition. Besides the orange ink composition and the red ink composition, the inks may also include a cyan ink composition, a magenta ink composition, a yellow ink composition, and a black ink composition. Since the inks include, besides the orange ink composition and the red ink composition, the ink compositions having various colors as described above, in a printed matter in which a curd coating film is formed on a recording medium, the color reproducibility in a warm color hue is not only improved, but also full color image formation can be realized. Hereinafter, various types of components contained in the ink will be described.

1.1. Polymerizable Compound

The ink preferably contains, as the polymerizable compound, a vinyl group-containing (meth)acrylate represented by the following formula (1).

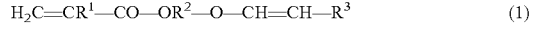

$$H_2C=CR^1-CO-OR^2-O-CH=CH-R^3 \qquad (1)$$

In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

In addition, the ink preferably contains, as the polymerizable compound, a monofunctional (meth)acrylate. As a molecular structure of the monofunctional (meth)acrylate, for example, an aromatic ring structure, an alicyclic structure, or a cyclic ether structure may be mentioned. The ink more preferably contains at least one monofunctional (meth)acrylate having an aromatic ring structure, an alicyclic structure, or a cyclic ether structure.

In addition, the vinyl group-containing (meth)acrylate represented by the formula (1) is also simply called the vinyl group-containing (meth)acrylate of the formula (1). The monofunctional (meth)acrylate having one of an aromatic ring structure, an alicyclic structure, and a cyclic ether structure is also simply called the monofunctional (meth)acrylate having a ring structure.

In addition, in this specification, (meth)acryloyl indicates at least one of acryloyl and methacryloyl corresponding thereto, (meth)acrylate indicates at least one of acrylate and methacrylate corresponding thereto, and (meth)acryl indicates at least one of acryl and methacryl corresponding thereto.

The polymerizable compound described above has a (meth)acryloyl group as a polymerizable functional group. The polymerizable functional group is preferably an acryloyl group in view of an ink curing property.

1.1.1. Vinyl Group-Containing (Meth)acrylate of Formula (1)

In the formula (1), as the divalent organic residue having 2 to 20 carbon atoms represented by $R^2$, for example, there may be mentioned a linear, a branched, or a cyclic substituted or unsubstituted alkylene group having 2 to 20 carbon atoms, a substituted or unsubstituted alkylene group having 2 to 20 carbon atoms and at least one of an ether bond and an ester bond in its structure, or a substituted or unsubstituted divalent aromatic group having 6 to 11 carbon atoms.

Among those mentioned above, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having 2 to 9 carbon atoms and an oxygen atom derived from an ether bond in its structure is preferable. Furthermore, in view of a decrease in viscosity of the ink and an improvement in curing property of the ink, as $R^2$, an alkylene group, such as an oxyethylene group, an oxy-n-propylene group, an oxyisopropylene group, or an oxybutylene group, having 2 to 9 carbon atoms and an oxygen atom derived from an ether bond in its structure, that is, a group having a glycol ether chain, is more preferable.

In the formula (1), as the monovalent organic residue having 1 to 11 carbon atoms represented by $R^3$, for example, there may be mentioned a linear, a branched, or a cyclic substituted or unsubstituted alkyl group having 1 to 10 carbon atoms or a substituted or unsubstituted aromatic group having 6 to 11 carbon atoms. Among those mentioned above, an alkyl group, such as a methyl group or an ethyl group, having 1 to 2 carbon atoms or an aromatic group, such as a phenyl group or a benzyl group, having 6 to 8 carbon atoms is preferable.

When the organic residue described above may be a substituted group, a substituent thereof is classified into a group containing at least one carbon atom and a group containing no carbon atoms. When the substituent is a group containing at least one carbon atom, the number of carbon atoms thereof is included in the number of carbon atoms of the organic residue. Although the group containing at least one carbon atom is not particularly limited, for example, a carboxy group or an alkoxy group may be mentioned. Although the group containing no carbon atoms is not particularly limited, for example, there may be mentioned a hydroxy group or a halo group.

Although a particular example of the vinyl group-containing (meth)acrylate of the formula (1) is not particularly limited, for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-3-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxethoxyethoxy)ethyl (meth)acrylate, 2-(vinyloxethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, a polyethylene glycol monovinyl ether (meth)acrylate, or a polypropylene glycol monovinyl ether (meth)acrylate. Among those particular examples described above, since the balance between the curing property and the viscosity of the ink is likely to be obtained, 2-(2-vinyloxyethoxy)ethyl acrylate is particularly preferable.

Since the vinyl group-containing (meth)acrylate of the formula (1) has a relatively preferable curing property, in an ink curing step, the curing property of the ink can be improved. In addition, the viscosity of the ink can be relatively decreased.

A content of the vinyl group-containing (meth)acrylate of the formula (1) in the ink with respect to a total mass of the ink is preferably 5.0 to 70.0 percent by mass, more preferably 10 to 40 percent by mass, and further preferably 10 to 30 percent by mass. Accordingly, the viscosity of the ink is decreased, and an ejection stability of the ink from an ink jet head of an ink jet apparatus is improved.

A content of the vinyl group-containing (meth)acrylate of the formula (1) in the ink with respect to a total mass of the polymerizable compounds is preferably 7 to 87 percent by mass, more preferably 12 to 50 percent by mass, and further preferably 12 to 37 percent by mass. Accordingly, the viscosity of the ink is decreased, and the ejection stability of the ink from the ink jet head is improved.

1.1.2. Monofunctional (Meth)acrylate Having Ring Structure

Although the monofunctional (meth)acrylate having an aromatic ring structure among the ring structures is not particularly limited, for example, there may be mentioned phenoxyethyl (meth)acrylate, benzyl (meth)acrylate, an alkoxylated 2-phenoxyethyl (meth)acrylate, ethoxylated nonylphenyl (meth)acrylate, an alkoxylated nonylphenyl (meth)acrylate, a p-cumylphenol EO-modified (meth)acrylate, or 2-hydroxy-3-phenoxypropyl (meth)acrylate.

Among those mentioned above, benzyl (meth)acrylate is preferable, phenoxyethyl (meth)acrylate is more preferable, and phenoxyethyl acrylate is further preferable. Accordingly, a solubility of a photopolymerization initiator having an aromatic ring structure to the ink is improved, and the curing property of the ink coating film is improved.

Although the monofunctional (meth)acrylate having an alicyclic structure among the ring structures is not particularly limited, for example, there may be mentioned isobornyl (meth)acrylate, 4-tert-butylcyclohexyl (meth)acrylate, 2-(meth)acrylic acid-1,4-dioxaspiro[4,5]dec-2-yl-methyl, or dicyclopentanyl acrylate.

Among those mentioned above, in view of the curing property of the ink and an abrasion resistance of the cured coating film, isobornyl acrylate (IBXA) or 4-tert-butylcyclohexyl acrylate (tert-butylcyclohexanol acrylate) is preferable.

Although the monofunctional (meth)acrylate having a cyclic ether structure among the ring structures is not particularly limited, for example, cyclic trimethylolpropane formal acrylate, tetrahydrofurfuryl acrylate, (2-methyl-2-ethyl-1,3-dioxasolane-4-yl)methyl acrylate, dicyclopentenyl (meth)acrylate, dicyclopentenyloxyethyl (meth)acrylate, or dicyclopentanyl (meth)acrylate may be mentioned.

The monofunctional (meth)acrylate having one of those ring structures may be used alone, or at least two types thereof may be used in combination. Accordingly, since the monofunctional (meth)acrylate having a ring structure has a relatively low viscosity, the viscosity of the ink can be decreased. In addition, since a contact angle to a recording medium is relatively small, in an ejection step of the ink, the ink is likely to wet-spread on the recording medium. Accordingly, the thickness of the cured coating film of the ink can be easily decreased.

In addition, the monofunctional (meth)acrylate is not limited to the (meth)acrylate having a ring structure, and a monofunctional (meth)acrylate without having an aromatic ring structure, an alicyclic structure, and a cyclic ether structure may also be used. The monofunctional (meth) acrylate having no ring structures as described above may be mentioned later as the monofunctional monomer. In addition, in this specification, the vinyl group-containing (meth)acrylate of the formula (1) is not included in the monofunctional (meth)acrylate and a polyfunctional monomer which will be described below.

The ink contains, as the polymerizable compound, the monofunctional (meth)acrylate with respect to the total mass of the ink in an amount of preferably 20 percent by mass or more and more preferably 25 percent by mass or more. Accordingly, an adhesive property between the cured coating film formed from the ink and the recording medium can be improved.

The ink contains the monofunctional (meth)acrylate with respect to the total mass of the polymerizable compounds contained in the ink in an amount of preferably 22 percent by mass or more and more preferably 27 percent by mass or more. Accordingly, the adhesive property between the cured coating film formed from the ink and the recording medium can be improved.

1.1.3. Other Polymerizable Compounds

Besides the polymerizable compounds described above, the ink may also contain other polymerizable compounds. Although polymerizable functional groups of the other polymerizable compounds are not particularly limited as long as capable of performing a polymerization reaction with radioactive rays, known polymerizable functional groups may be used. In particular, in view of the curing property, the polymerizable functional group is preferably an unsaturated double bond between carbons, more preferably a methacryloyl group, and further preferably an acryloyl group. For the other polymerizable compounds, a monofunctional monomer, a polyfunctional monomer, or an oligomer may be used.

1.1.3.1. Monofunctional Monomer

Although the monofunctional monomer is not particularly limited, for example, there may be mentioned a linear or a branched aliphatic group-containing (meth)acrylate, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, 2-hydroxyethyl (meth)acrylate, or 2-hydroxypropyl (meth)acrylate; a nitrogen-containing monofunctional vinyl monomer, such as a lactone-modified flexible (meth)acrylate, N-vinylcaprolactam, N-vinylformamide, N-vinylcarbazole, N-vinylacetamide, or N-vinylpyrrolidone; a nitrogen-containing monofunctional acrylate monomer such as acryloylmorpholine; or a nitrogen-containing monofunctional acrylamide monomer, such as (meth)acrylamide, N-hydroxymethyl (meth)acrylamide, diacetone (meth)acrylamide, N,N-dimethyl (meth)acrylamide, or a (meth)acrylamide derived, for example, from dimethylamino ethylacrylate, benzyl chloride quaternary.

As a monofunctional monomer other than those mentioned above, for example, there may be mentioned an unsaturated carboxylic acid, such as (meth)acrylic acid, itaconic acid, crotonic acid, isocrotonic acid, or maleic acid; a salt of one of the unsaturated carboxylic acids mentioned above; an ester, an urethane, an amide, or an anhydride of an unsaturated carboxylic acid; a vinyl compound, such as acrylonitrile or styrene; or an unsaturated polyester, an unsaturated polyether, an unsaturated polyamide, or an unsaturated urethane.

1.1.3.2. Polyfunctional Monomer

Although the polyfunctional monomer is not particularly limited, for example, there may be mentioned a difunctional (meth)acrylate, such as dipropylene glycol di(meth)acrylate, diethylene glycol di(meth)acrylate, triethylene glycol di(meth)acrylate, tetraethylene glycol di(meth)acrylate, a polyethylene glycol di(meth)acrylate, tripropylene glycol di(meth)acrylate, a polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, di(meth)acrylate of an EO (ethylene oxide) adduct of bisphenol A, di(meth)acrylate of a PO (propylene oxide) adduct of bisphenol A, hydroxypivalic acid neopentyl glycol di(meth)acrylate, or a polytetramethylene glycol di(meth)acrylate; or a polyfunctional (meth)acrylate monomer having at least three functional groups, such as trimethylolpropane tri(meth)acrylate, an EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritol ethoxy tetra(meth)acrylate, or caprolactam-modified dipentaerythritol hexa(meth)acrylate.

1.1.3.3. Oligomer

The oligomer is a multimer containing polymerizable compounds each functioning as a constituent component and is a compound having at least one functional group. In addition, the polymerizable compound in this case is not limited to the polymerizable compounds described above. In this specification, a polymerizable compound having a molecular weight of 1,000 or less is regarded as the monomer, and a polymerizable compound having a molecular weight of more than 1,000 is regarded as the oligomer.

As the oligomer, for example, there may be mentioned an urethane acrylate oligomer having urethanes as a repeating unit, a polyester acrylate oligomer having esters as a repeating unit, or an epoxy acrylate oligomer derived from a polymerizable compound having epoxy groups as a repeating unit.

Among those mentioned above, the urethane acrylate oligomer is preferably used. In the urethane acrylate oligomer, an aromatic urethane acrylate oligomer is preferable, and an aliphatic urethane acrylate oligomer is more preferable. In addition, the number of polymerizable functional groups of the urethane acrylate oligomer is preferably four or less and more preferably two or less. Accordingly, the increase in viscosity of the ink is suppressed, and in addition, the curing property of the ink and the adhesive property of the cured coating film are also improved.

1.2. Photopolymerization Initiator

A photopolymerization initiator generates active species when being irradiated with radioactive rays and has a function to advance the polymerization reaction of the polymerizable compound by the active species. The active species generated from the photopolymerization initiator are, in particular, radicals, acids, or bases. In addition, when the (meth)acrylate-based polymerizable compound described above is used, a photopolymerization initiator to generate radicals as the active species is preferably used.

As long as having the function described above, the photopolymerization initiator is not particularly limited, and for example, there may be mentioned a known photopolymerization initiator, such as an acylphosphine oxide-based photopolymerization initiator, an alkylphenone-based photopolymerization initiator, a titanocene-based photopolymerization initiator, or a thioxanthone-based photopolymerization initiator. Among those mentioned above, the acylphosphine oxide-based photopolymerization initiator to generate radicals is preferable. Accordingly, the curing property of the ink, in particular, the curing property in a curing process using light emitted from an ultraviolet light-emitting diode (UV-LED), is improved. The photopolymerization initiator may be used alone, or at least two types thereof may be used in combination.

Although the acylphosphine oxide-based photopolymerization initiator is not particularly limited, for example, there may be mentioned 2,4,6-trimethylbenzoyl diphenylphosphine oxide, bis(2,4,6-trimethylbenzoyl)-phenylphosphine oxide, or bis(2,6-dimethoxybenzoyl)-2,4,4-trimethylpentylphosphine oxide.

As the acylphosphine oxide-based photopolymerization initiator described above, a commercially available product may also be used. As the above commercially available product, for example, there may be mentioned Omnirad (registered trademark) 819 (bis(2,4,6-trimethylbenzoyl)-phenylphosphine oxide), Omnirad 1800 (mixture of bis(2,6-diimethoxybenzoyl)-2,4,4-trimethylpentylphosphine oxide and 1-hyroxy-cyclohexyl-phenyl ketone at a mass ratio of 25:75), or Omnirad TPO (2,4,6-trimethylbenzoyl)-diphenylphosphine oxide) manufactured by IGM RESINS B. V.; or Speedcure (registered trademark) TPO (2,4,6-trimethylbenzoyl)-diphenylphosphine oxide) manufactured by Lambson Group Ltd.

A content of the photopolymerization initiator contained in the ink with respect to the total mass of the ink is preferably 3 to 15 percent by mass, more preferably 5 to 12 percent by mass, and further preferably 7 to 11 percent by mass. Accordingly, the curing property of the ink is improved, and in addition, the solubility of the photopolymerization initiator is also secured.

1.3. Colorant

The colorant colors the cured coating film formed from the ink. Since the cured coating film of the ink is colored, a recording medium can be colored, and for example, a color image can be printed on the recording medium. When the colorant is changed, inks, such as an orange ink composition, a red ink composition, a cyan ink composition, a magenta ink composition, a yellow ink composition, and a black ink composition, are formed to exhibit various colors. For the colorant, a pigment or a dye is used. In order to improve a light resistance of the cured coating film formed from the ink, a pigment is preferably used as the colorant.

In addition, in this specification, the definitions of the orange ink composition, the red ink composition, and the magenta ink composition will be described with reference to Table 1. Table 1 is a table showing the ranges of specific values relating to color tones of the above three color inks. $L^*$ represents the brightness, $a^*$ and $b^*$ represent the chromaticity, $C^*$ represents the saturation, and h represents the hue angle.

TABLE 1

| INK | $L^*$ | $a^*$ | $b^*$ | $C^*$ | h |
|---|---|---|---|---|---|
| ORANGE INK COMPOSITION | 65-69 | 42-53 | 49-69 | 71-84 | 43-58 |
| RED INK COMPOSITION | 40-60 | 55-80 | 29-63 | 60-90 | 24-44 |
| MAGENTA INK COMPOSITION | 47-57 | 51-66 | −16-7 | 53-66 | −16-7 |

In particular, the inks are each prepared to contain 5.0 percent by mass of a pigment with respect to the total mass. Next, the inks are each applied on a PET (poly(ethylene terephthalate)) film to have a thickness of 12 μm by a bar coater. The ink thus applied is irradiated with ultraviolet rays emitted from an UV-LED (ultraviolet light-emitting diode) functioning as a light source device to have a tack-free state, so that a cured coating film of the ink is formed. By a colorimeter, Spectrolino, manufactured by X-RITE, $L^*$, $a^*$, $b^*$, of the cured coating film thus obtained are measured at a viewing angle of 2° using a light source D65 and no light source filter. In addition, from the measurement values thus obtained, h and $C^*$ are calculated. When all of $L^*$, $a^*$, $b^*$, $C^*$, and h thus obtained are in the ranges of the specific values of each color ink shown in Table 1, the cured coating film thus measured is regarded to have the color of the ink described above. In addition, for the calculation of h and $C^*$, known equations are used. In addition, a composition of the ink other than the colorant is obtained such that in any one of the compositions of Examples described later, an amount increased by the pigment is subtracted from the amount of the polyfunctional monomer.

The orange ink composition and the red ink composition preferably contain, as the colorant, a perinone-based pigment, a perylene-based pigment, or a diketopyrrolopyrrole-based pigment. Accordingly, in a printed matter in which the cured coating film of the ink is formed, the color reproducibility in a warm color hue is further improved.

As a colorant of the orange ink composition, a perinone-based pigment such as C.I. (Colour Index Generic Name) Pigment Orange 43 or a diketopyrrolopyrrole-based pigment such as C.I. Pigment Orange 71 or 73 is preferably used. Accordingly, in the warm color hue, the color reproducibility can be further improved. In addition, the light resistance of the printed matter can also be improved.

As a colorant of the red ink composition, a perylene-based pigment such as C.I. Pigment Red 179 or 224 or a diketopyrrolopyrrole-based pigment such as C.I. Pigment Red 254 or 255 is preferably used. Accordingly, in the warm color hue, the color reproducibility can be further improved. In addition, the light resistance of the printed matter can also be improved.

For the inks other than the orange ink composition and the red ink composition, known organic pigments and inorganic pigments are both used. As the organic pigment, for example, there may be mentioned an azo pigment, such as an azo lake pigment, an insoluble azo pigment, a condensed azo pigment, or a chelate azo pigment; a polycyclic pigment, such as a phthalocyanine pigment, a perylene pigment, a perinone pigment, an anthraquinone pigment, a quinacridone pigment, a dioxazine pigment, a thioindigo pigment, an isoindolinone pigment, an isoindoline pigment, a quinophthalone pigment, or a diketopyrrolopyrrole pigment; a dye lake pigment, such as a basic dye lake or an acidic dye lake; a nitro pigment, a nitroso pigment, an aniline black, or a daylight fluorescent pigment. As the inorganic pigment, for example, there may be mentioned a metal oxide pigment, such as titanium dioxide, zinc oxide, or chromium oxide; or a carbon black. In addition, a bright pigment, such as a pearl pigment or a metallic pigment, may also be used.

As the colorant of the cyan ink composition, for example, there may be mentioned C.I. Pigment Blue 1, 2, 3, 15, 15:1, 15:2, 15:3, 15:34, 15:4, 16, 18, 22, 25, 60, 65, or 66.

As the colorant of the magenta ink composition, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 168, 170, 171, 175, 176, 184, 185, 187, 202, 209, 219, or 245, or C.I. Pigment Violet 19, 23, 32, 33, 36, 38, 43, or 50. Among those mentioned above, in order to improve the color reproducibility in the warm color hue, one of C.I. Pigment Red 57:1 and 122 and C.I. Pigment Violet 19 is preferably used.

As the colorant of the yellow ink composition, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, 180, or 185. Among those mentioned above, in order to improve the color reproducibility and the light resistance of the cured coating film in the warm color hue, one of C.I. Pigment Yellow 150, 155, 180, and 185 is preferably used.

As the colorant of the black ink composition, for example, there may be mentioned C.I. Pigment Black 1, 6, 7, or 11. Among those mentioned above, a carbon black which is C.I. Pigment Black 7 is preferably used.

As a particular example of the carbon black, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven (registered trademark) 5750, 5250, 5000, 3500, 1255, or 700 (manufactured by Columbia Carbon Co., Ltd.); Regal (registered trademark) 400R, 330R, or 660R, Mogul (registered trademark) L, Monarch (registered trademark) 700, 800, 880, 900, 1000, 1100, 1300, or 1400 (manufactured by Cabot Corporation); or Color Black FW1, FW2, FW2V, FW18, FW200, S150, S160, or S170, Printex (registered trademark) 35, U, V, or 140U, or Special Black 6, 5, 4A, or 4 (manufactured by Degussa).

As a pigment of the ink other than those described above, for example, there may be mentioned C.I. Pigment White 6, 18, or 21, C.I. Pigment Green 7 or 10, or C.I. Pigment Brown 3, 5, 25, or 26.

The pigment may be used alone, or at least two types thereof may be used in combination. A dispersant which will be described later may also be used in combination with the pigment. In addition, an average particle diameter of the pigment is preferably 300 nm or less and is more preferably 50 to 200 nm. When the average particle diameter of the pigment is in the range described above, for example, an ejection property and a dispersion stability of the ink are improved, and in addition, an image quality of an image in the printed matter is improved. In addition, the average particle diameter in this case indicates a volume-basis particle size distribution (50%) measured by a dynamic light scattering method.

A content of the pigment in the ink with respect to the total mass of the ink is 0.2 to 20.0 percent by mass, preferably 1.0 to 20.0 percent by mass, more preferably 1.0 to 15.0 percent by mass, and further preferably 1.0 to 10.0 percent by mass.

1.4. Additives

In addition, in needed, the ink may also contain additives, such as a dispersant, a polymerization inhibitor, a slipping agent, a photosensitizer, and a fluorescent whitening agent.

1.4.1. Dispersant

The dispersant imparts a dispersing property to the pigment in the ink. When the dispersant is used, the pigment is stably dispersed in the ink, and, for example, a sedimentation resistance of the ink during the storage thereof and the ejection stability of the ink from the ink jet head are improved.

Although the dispersant is not particularly limited, for example, there may be mentioned a known dispersant, such as a polymer dispersant, which is generally used for preparation of a pigment dispersion liquid. As a particular example of the dispersant, for example, there may be mentioned a dispersant containing, as a primary component, at least one selected from the group consisting of a polyoxyalkylene polyalkylene polyamine, a vinyl-based polymer, a vinyl-based copolymer, an acrylic-based polymer, an acrylic-based copolymer, a polyester, a polyamide, a polyimide, a polyurethane, an amino-based polymer, a silicone-containing polymer, a sulfur-containing polymer, a fluorine-containing polymer, and an epoxy resin. The dispersant may be used alone, or at least two types thereof may be used in combination.

As the polymer dispersant, a commercially available product may also be used. For example, there may be mentioned Ajisper (registered trademark) Series manufactured by Ajinomoto Fine-Techno Co., Inc.; Solsperse (registered trademark) Series, such as Solsperse 36000, manufactured by Lubrizol; Disper BYK Series manufactured by BYK Additives & Instruments; or Disperlon (registered trademark) Series manufactured by Kusumoto Chemicals, Ltd.

A content of the dispersant contained in the ink with respect to the total mass of the ink is preferably 0.05 to 2.50 percent by mass and more preferably 0.10 to 2.00 percent by mass. Accordingly, the storage stability and the ejection stability of the ink are improved.

1.4.2. Polymerization Inhibitor

The polymerization inhibitor suppresses an unintentional polymerization reaction of the polymerizable compound, for example, during storage and improves the storage stability of the ink. The polymerization inhibitor may be used alone, or at least two types thereof may be used in combination.

Although the polymerization inhibitor is not particularly limited, for example, there may be mentioned 4-methoxyphenol, 4-hydroxy-2,2,6,6-tetramethypyperidinyl-1-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), or a hindered amine compound.

When the polymerization inhibitor is added, a content of the polymerization inhibitor contained in the ink with respect to the total mass of the ink is preferably 0.05 to 1.00 percent by mass and more preferably 0.05 to 0.50 percent by mass.

1.4.3. Slipping Agent

The slipping agent improves the abrasion resistance of the cured coating film of the ink. The slipping agent may be used alone, or at least two types thereof may be used in combination.

As the slipping agent, a silicone-based surfactant is preferable, and a polyester-modified silicone or a polyether-modified silicone is more preferable. As the slipping agent mentioned above, a commercially available product may be used, and for example, a polyester-modified silicone, such as BYK (registered trademark)-347 or -348, or BYK-UV3500, -3510, or -3530, or a polyether-modified silicone such as BYk-3570 (each manufactured by BYK Additives & Instruments), may be mentioned.

When the slipping agent is added, a content of the slipping agent contained in the ink with respect to the total mass of the ink is preferably 0.01 to 2.00 percent by mass and more preferably 0.05 to 1.00 percent by mass.

1.4.4. Photosensitizer

When absorbing radioactive rays, the photosensitizer is excited to promote the generation of active species from the photopolymerization initiator. The photosensitizer may be used alone, or at least two types thereof may be used in combination.

As the photosensitizer, for example, there may be mentioned an amine compound, such as an aliphatic amine, an amine containing an aromatic group, piperidine, a reaction product between an epoxy resin and an amine, or triethanolamine triacrylate; an urea compound, such as allylthiourea or o-tolylthiourea; a sulfur compound, such as sodium diethyl dithiophosphate or a soluble salt of an aromatic sulfinic acid; a nitrile compound, such as N,N-diethyl-p-aminobenzonitrile; a phosphorus compound, such as tri-n-butylphosphine or sodium diethyl dithiophosphide; a nitrogen-containing compound, such as Michler's ketone, an N-nitrosohydroxylamine derivative, an oxazolidine compound, a tetrahydro-1,3-oxazdine compound, or a condensed compound of formaldehyde or acetaldehyde with a diamine; or a chloride compound, such as carbon tetrachloride or hexachloroethane. In addition, the thioxanthone-based photopolymerization initiator described above may also be used as the photosensitizer. As the photosensitizer described above, for example, 2,4-diethylthioxantone may be mentioned.

When the photosensitizer is added, a content of the photosensitizer contained in the ink with respect to the total mass of the ink is preferably 0.5 to 3.0 percent by mass.

1.4.5. Fluorescent Whitening Agent

The fluorescent whitening agent absorbs light having a wavelength of, for example, approximately 300 to 450 nm and emits fluorescent light having a wavelength of approximately 400 to 500 nm. That is, when ultraviolet rays are used as the radioactive rays, the fluorescent whitening agent increases a long wavelength region of ultraviolet rays to be emitted to the ink, so that the curing property of the ink is improved.

As the fluorescent whitening agent, for example, there may be mentioned a naphthalene benzoxazolyl derivative, a thiophene benzoxazolyl derivative, a stilbene benzoxazolyl derivative, a cumarin derivative, a styrene biphenyl derivative, a pyrazolone derivative, a stilbene derivative, a styryl derivative of benzene or biphenyl, a bis(benzazol-2-yl) derivative, a derivative of carbostyril, naphthalimide, or dibenzothiophene-5,5'-dioxide, a pyrene derivative, or a pyridotriazole. The fluorescent whitening agent may be used alone, or at least two types thereof may be used in combination.

As the fluorescent whitening agent, a commercially available product may also be used. As the commercially available product, for example, there may be mentioned TELA-LUX (registered trademark) OB (2,5-bis(5-tert-butyl-2-benzoxazolyl)thiophene or KCB (1,4-bis(2-benzoxazolyl) naphthalene) (each manufactured by Clariant (Japan) K.K.).

A content of the fluorescent whitening agent contained in the ink with respect to the total mass of the ink is preferably 0.07 to 0.70 percent by mass and more preferably 0.10 to 0.50 percent by mass. Accordingly, the curing property of the ink is improved.

2. Method to Prepare Ink

For preparation of the ink, the components described above are mixed together and are then sufficiently stirred so as to be uniformly mixed with each other. In addition, in an ink preparation process, at least one of an ultrasonic treatment and a heating treatment may be performed on a mixture in which the polymerizable compounds are at least partially mixed with the photopolymerization initiator. Accordingly, a dissolved oxygen amount in an ink thus prepared is decreased, and hence, the ejection stability and/or the storage stability of the ink is improved.

3. Physical Properties of Ink

A viscosity of the ink at 20° C. is preferably 10 to 30 mPa·s (millipascal·seconds), more preferably 10 to 25 mPa·s, and further preferably 10 to 20 mPa·s. Accordingly, an appropriate amount of the ink is ejected from the ink jet head, and hence, flight curving and scattering of ink liquid droplets can be suppressed. In addition, the viscosity of the ink may be measured using a viscoelastic measurement device, MCR-300, manufactured by Pysica such that while a shear rate is increased from 10 to 1,000 in an environment at 20° C., a viscosity at a shear rate of 200 is read.

A surface tension of the ink at 20° C. is preferably 20 to 40 mN/m. Accordingly, the ink becomes unlikely to wet a nozzle surface of an ink jet head processed by a liquid repellent treatment. Hence, an appropriate amount of the ink is normally ejected from the ink jet head, and the flight curving and the scattering of the ink liquid droplets can be suppressed. In addition, the surface tension of the ink may be measured using an automatic surface tension meter, CBVP-Z, manufactured by Kyowa Interface Science Co., Ltd. such that when a platinum plate is wetted with the ink in an environment at 20° C., the surface tension thereof is confirmed.

4. Ink Jet Apparatus

As an ink jet apparatus according to this embodiment, a serial type ink jet printer will be described by way of example with reference to FIGURE. In FIGURE, the size of each member is appropriately changed so as to be recognizable, and hence, the scale thereof is made different from the actual value.

An ink jet printer 1 according to this embodiment is a so-called serial type printer. The serial type printer is a printer in which an ink jet head is mounted on a carriage which is transferred in a predetermined direction, and while the ink jet head is transferred in association with the transfer of the carriage, printing is performed. Hereinafter, the ink jet printer 1 is simply called the printer 1 in some cases.

As shown in FIGURE, the printer 1 includes an ink jet head 3, a carriage 4, a main scanning mechanism 5, a platen roller 6, a light source 11, and a control portion (not shown) which controls the entire operation of the printer 1. The carriage 4 mounts the ink jet head 3 and the light source 11. In addition, the carriage 4 detachably mounts ink cartridges 7*a*, 7*b*, 7*c*, 7*d*, 7*e*, and 7*f* each functioning as a container in which an ink is received. The inks contained in the ink cartridges 7a, 7b, 7c, 7d, 7e, and 7f are supplied to the ink jet head 3.

The main scanning mechanism 5 includes a timing belt 8 coupled to the carriage 4, a motor 9 to drive the belt 8, and a guide shaft 10. The guide shaft 10 functions as a support member of the carriage 4 and is provided along a main scanning direction which is a scanning direction of the carriage 4. The carriage 4 is driven by the motor 9 with the timing belt 8 interposed therebetween and is configured to be reciprocally transferred along the guide shaft 10. Accordingly, the main scanning mechanism 5 reciprocally transfers the carriage 4 in the main scanning direction.

The platen roller 6 transports a recording medium 2 to which the ink is adhered in a sub-scanning direction orthogonal to the main scanning direction. Hence, the recording medium 2 is transported in the sub-scanning direction approximately coincident with a length direction of the recording medium 2. The carriage 4 can be reciprocally transferred in the main scanning direction approximately coincident with a width direction of the recording medium 2. Hence, the ink jet head 3 and the light source 11 can be relatively scanned with respect to the recording medium 2 in the main scanning direction and the sub-scanning direction.

The ink cartridges 7a, 7b, 7c, 7d, 7e, and 7f are independent six ink cartridges. In the ink cartridges 7a, 7b, 7c, 7d, 7e, and 7f, the orange ink composition, the red ink composition, and the various types of color inks other than those mentioned above are respectively contained.

For example, color inks having colors, such as black, cyan, magenta, and yellow, are received in the respective ink cartridges 7a, 7b, 7c, and 7d; the orange ink composition is received in the ink cartridge 7e; and the red ink composition is received in the ink cartridge 7f. In addition, the arrangement, the shapes, and the number of the ink cartridges 7a, 7b, 7c, 7d, 7e, and 7f are not limited to those described above. In addition, at least one ink different from the inks having colors, such as black, cyan, magenta, and yellow, may be added thereto or may be used instead of one ink thereof.

At bottom portions of the ink cartridges 7a, 7b, 7c, 7d, 7e, and 7f, supply ports (not shown) to supply the inks thus received to the ink jet head 3 are provided.

For members to form the ink cartridge 7a to the ink cartridge 7f, for example, materials are used which are not liable to cause evaporation and deterioration of the ink components and which are not liable to be deteriorated by the ink components. In this embodiment, as the ink container of the ink, although the ink cartridge is described by way of example, the ink container is not limited thereto, and as the ink container, for example, besides the ink cartridge, an ink pack or an ink bottle may also be used.

At a side of the carriage 4 facing the recording medium 2, the ink jet head 3 and the light source 11 are disposed. The ink jet head 3 has a nozzle surface (not shown) at a side facing the recording medium 2. On the nozzle surface, as a liquid repellent film, a polymer film containing a fluorine compound or a silicone compound or an eutectoid plating film containing nickel and a fluorine compound may be formed. In addition, although not shown in the drawing, in the nozzle surface, nozzle lines each having a plurality of ejection nozzles are disposed for the respective inks. The inks are supplied to the ink jet head 3 from the respective ink cartridges 7a, 7b, 7c, 7d, 7e, and 7f and are then ejected in the form of liquid droplets of the ink from the ejection nozzles by actuators (not show) in the ink jet head 3. The liquid droplets of the ink thus ejected are landed on and adhered to the recording medium 2.

In the ink jet head 3, as the actuator functioning as a drive device, although a piezoelectric element is used, the actuator is not limited thereto. As the drive device, for example, an electromechanical conversion element which displaces a vibration plate functioning as an actuator by electrostatic absorption or an electrothermal conversion element which ejects an ink in the form of liquid droplets by air bubbles generated by heating may also be used.

The light source 11 is disposed beside the ink jet head 3 in the main scanning direction. The light source 11 is a radiation emission device and includes, for example, a light-emitting element, such as an UV-LED, which is not shown. Radioactive rays emitted from the light source 11 are not limited to ultraviolet rays and may includes infrared rays, electron rays, visible light rays, X-rays, and the like. In view of reduction of size and cost, a light-emitting element, such as a light-emitting diode (LED) or a semiconductor laser diode (LD), is preferably used. In addition, as the light source 11, a lamp may also be used instead of using the light-emitting element described above.

The light source 11 is not limited to be disposed beside the ink jet head 3 in the main scanning direction and may be disposed beside the ink jet head 3 along the sub-scanning direction at a side opposite to a direction in which the recording medium 2 is transported. In addition, the light source 11 is not limited to be disposed at the carriage 4 and may be provided separately therefrom.

Since the radioactive rays are emitted from the light source 11 to the liquid droplets of the ink adhered to the recording medium 2, a photopolymerization reaction of the polymerizable compound in the ink proceeds, and the liquid droplets of the ink are cured, so that the cured coating film of the ink is formed. Accordingly, by coloration of the recording medium 2 or formation of images, colors, characters, patterns, and the like on the recording medium 2, printing is performed.

The printer 1 includes the ink jet head 3 to eject a plurality of inks including the orange ink composition and the red ink composition described above, and the plurality of inks is printed on the recording medium 2 by one printing operation.

The one printing operation described above indicates that a series of steps in which the recording medium 2 is supplied to the printer 1, the printed matter is obtained by forming the cured coating film of the ink on the recording medium 2, and the printed matter is recovered from the printer 1 is performed one time. That is, the case is excluded in which after the recording medium 2 on which the cured coating film of the ink is formed is recovered from the printer 1, the same recording medium 2 is again supplied thereto, and another cured coating film is formed again by adhering the ink to the same recording medium 2. On the other hand, the case in which from the supply of the recording medium 2 to the printer 1 to the recovery thereof from the printer 1, the adhesion of the ink to the recording medium 2 and the curing of the ink are repeatedly performed is to be included in the one printing operation.

In this embodiment, as the ink jet apparatus, although the on-carriage type printer 1 is described by way of example, the ink jet apparatus is not limited thereto. The ink jet apparatus may also be, for example, an off-carriage type printer, such as a large format printer, in which ink containers are not mounted on a carriage. In addition, the ink jet apparatus used for the ink jet method of this embodiment is not limited to the serial printer and may also be a line head printer in which an ink jet head is formed to have a width equal to or larger than the width of the recording medium 2 and in which printing is performed without moving the ink jet head.

5. Recording Medium

The ink of this embodiment is preferably used for label applications including food packages and signage applications. As the recording medium 2 for those applications, a medium containing one of a poly(vinyl chloride); a polyester such as a polyethylene terephthalate); a polyolefin, such as a polyethylene or a polypropylene; a polyamide such as a nylon or an aramid; a polycarbonate, and a metal may be mentioned.

In addition, the recording medium 2 may contain a cellulose, such as a cellulose diacetate, a cellulose triacetate, a cellulose propionate, cellulose butyrate, a cellulose acetate butyrate, or a cellulose nitrate; a polystyrene, a poly(vinyl acetal); or glass, paper, or wood.

As the form of the recording medium 2, for example, a roll shape including a film, a cut sheet, a board, or a cloth may be mentioned. In a substrate of the recording medium 2, a material imparting a defogging property and/or an antistatic property and an antioxidant agent may be contained. As the material imparting a defogging property and/or an antistatic property, for example, an anionic, a nonionic, or a cationic surfactant, a vinyl-based resin, or an acrylic-based resin may be mentioned. As the antioxidant agent, for example, a phenol-based, a thioether-based, or a phosphate-based agent may be mentioned.

6. Ink Jet Method

An ink jet method according to this embodiment will be described. The ink jet method of this embodiment includes an ejection step of adhering the ink to the recording medium 2 by ejection thereof from the ink jet head 3 and a curing step of irradiating the ink adhered to the recording medium 2 with radioactive rays emitted from the light source 11 so as to obtain the cured coating film of the ink. Hereinafter, the steps of the ink jet method of this embodiment will be described.

6.1. Ejection Step

In the ejection step, a plurality of inks including the orange ink composition and the red ink composition are adhered to the recording medium 2. In particular, the ink is ejected from the ink jet head 3 of the printer 1 and then adhered to the recording medium 2. In particular, by driving a piezoelectric element, each ink filled in a pressure generation chamber of the ink jet head 3 is ejected from the ejection nozzle. In this step, the carriage 4 is relatively transferred with respect to the recording medium 2, and in addition, the type of ink to be ejected from the ink jet head 3 and the ejection amount thereof are adjusted, so that a liquid layer of the ink to be used as the base of a desired image is formed on the recording medium 2.

6.2. Curing Step

In the curing step, the cured coating film is formed from the liquid layer of the ink on the recording medium 2. In particular, radioactive rays are emitted from the light source 11 to a predetermined position of the recording medium 2. An emission region of the radioactive rays with respect to the recording medium 2 may include a region to which the ink is adhered. By the emission of the radioactive rays, the photopolymerization reaction of the polymerizable compound in the ink proceeds in the liquid layer of the ink on the recording medium 2, and the ink is cured, so that the cured coating film is formed.

Although an oxide concentration in an environment in the curing step is not particularly limited, the concentration described above is preferably 15 percent by volume or less, more preferably 10 percent by volume of less, and further preferably 5 percent by volume or less. Accordingly, the photopolymerization reaction is suppressed from being disturbed by oxygen, and the curing property of the ink can be improved. In particular, in a radical polymerization reaction, by a radical generated from the photopolymerization initiator and a radical polymerizable double bond of a (meth) acrylate or the like, the polymerization reaction proceeds. On the other hand, since oxygen has a high reactivity with the radical than the double bond described above, when the oxygen concentration in the reaction system is high, the radical is consumed by the reaction with oxygen. A different radical generated by the reaction between oxygen and the radical has a low reactivity with the double bond, and as a result, the radical polymerization reaction is disturbed by oxygen.

In order to obtain an oxygen concentration of 15 percent by volume or less in the curing step, an inert gas, such as nitrogen or carbon dioxide, may be diffused in the atmosphere in the curing step. The oxygen concentration may be measured by a know oxygen concentration meter or the like.

By the steps described above, the printed matter in which the cured coating film is formed on the recording medium 2 is obtained. In addition, according to the ink jet method of this embodiment, within the one printing operation in which after the recording medium 2 is supplied to the printer 1, and the cured coating film of the ink is formed, the recording medium 2 is recovered from the printer 1, the ejection step and the curing step may be repeatedly performed.

The maximum coating thickness of the cured coating film formed on the recording medium 2 may be appropriately determined in accordance with the application of the printed matter and the type of recording medium 2. The maximum coating thickness of the cured coating film can be measured, for example, as described below. By using a microtome, a section sample or a cross-section sample is formed from the printed matter, and the thickness thereof is measured by a microscope. Alternatively, the thickness is measured by a laser microscope in a non-destructive manner. One of the measurement methods described above is performed on at least 5 positions in a printed region of the printed matter at a dot generation amount of 100%, and the largest film thickest obtained thereby is regarded as the maximum film thickness.

According to this embodiment, the following effect is obtained.

In the warm color hue, the color reproducibility of the printed matter can be improved. Since the orange ink composition and the red ink composition are used in one printing operation, compared to the case in which the respective color ink compositions are separately used, or compared to the case in which the orange ink composition and the red ink composition are both not used, a warm color gamut is expanded. That is, an ink jet method and a printer 1 each of which improves the color reproducibility in the warm color hue can be provided.

7. Examples and Comparative Examples

Hereinafter, with reference to Examples and Comparative Examples, the effect of the present disclosure will be described in more detail. In addition, the present disclosure is not limited to the following Examples.

The compositions of the respective inks to be used for evaluation printed matters of Examples and Comparative Examples are shown in Tables 2 and 3. Table 2 is a composition table showing orange ink compositions O-1 to O-5 and red ink compositions R-1 to R-5. Table 3 is a composition table showing a cyan ink composition C-1, a magenta ink composition M-1, a yellow ink composition Y-1, and a black ink composition B-1.

In Tables 2 and 3, the numerical unit represents percent by mass, and a column in which—is shown instead of the numerical value indicates that no component is contained. In Tables 2 and 3, the components are designated by the abbreviations or trade names thereof. Those abbreviations and trade names will be described later. In addition, in the columns of the pigment name in Tables 2 and 3, "C.I." is omitted.

TABLE 2

| COMPONENT CLASSIFICATION | COMPONENT NAME OR TRADE NAME | O-1 | O-2 | O-3 | O-4 | O-5 |
|---|---|---|---|---|---|---|
| VINYL GROUP-CONTAINING (METH)ACRYLATE OF FORMULA (1) | VEEA | 20.00 | 3.00 | 20.00 | 20.00 | 20.00 |
| MONOFUNCTIONAL (METH)ACRYLATE | PEA | 31.80 | 36.75 | 31.80 | 31.80 | 31.80 |
| | DCPA | — | 7.00 | — | — | — |
| | IBXA | — | 23.00 | — | — | — |
| MONOFUNCTIONAL MONOMER | ACMO | — | 12.00 | — | — | — |
| POLYFUNCTIONAL MONOMER | DPGDA | 30.00 | — | 30.00 | 30.00 | 30.00 |
| PHOTOPOLYMERIZATION INITIATOR | Omnirad 819 | 5.00 | 5.00 | 5.00 | 5.00 | 5.00 |
| | Speedcure TPO | 5.00 | 5.00 | 5.00 | 5.00 | 5.00 |
| PIGMENT FOR ORANGE INK COMPOSITION | PIGMENT ORANGE 43 | 3.00 | 3.00 | — | — | — |
| | PIGMENT ORANGE 71 | — | — | 3.00 | — | — |
| | PIGMENT ORANGE 73 | — | — | — | 3.00 | — |
| | PIGMENT ORANGE 64 | — | — | — | — | 3.00 |
| PIGMENT FOR RED INK COMPOSITION | PIGMENT RED 254 | — | — | — | — | — |
| | PIGMENT RED 255 | — | — | — | — | — |
| | PIGMENT RED 179 | — | — | — | — | — |
| | PIGMENT RED 224 | — | — | — | — | — |
| DISPERSANT | Solsperse 36000 | 1.50 | 1.50 | 1.50 | 1.50 | 1.50 |
| POLYMERIZATION INHIBITOR | MEHQ | 0.20 | 0.15 | 0.20 | 0.20 | 0.20 |
| | LA-7RD | — | 0.10 | — | — | — |
| SLIPPING AGENT | BYK-UV3500 | 0.50 | 0.50 | 0.50 | 0.50 | 0.50 |
| PHOTOSENSITIZER | Speedcure DETX | 3.00 | 3.00 | 3.00 | 3.00 | 3.00 |
| TOTAL | | 100.00 | 100.00 | 100.00 | 100.00 | 100.00 |

| COMPONENT CLASSIFICATION | COMPONENT NAME OR TRADE NAME | R-1 | R-2 | R-3 | R-4 | R-5 |
|---|---|---|---|---|---|---|
| VINYL GROUP-CONTAINING (METH)ACRYLATE OF FORMULA (1) | VEEA | 20.00 | 3.00 | 20.00 | 20.00 | 20.00 |
| MONOFUNCTIONAL (METH)ACRYLATE | PEA | 32.10 | 37.00 | 32.10 | 32.10 | 32.10 |
| | DCPA | — | 7.00 | — | — | — |
| | IBXA | — | 23.00 | — | — | — |
| MONOFUNCTIONAL MONOMER | ACMO | — | 12.00 | — | — | — |
| POLYFUNCTIONAL MONOMER | DPGDA | 30.00 | — | 30.00 | 30.00 | 30.00 |
| PHOTOPOLYMERIZATION INITIATOR | Omnirad 819 | 5.00 | 5.00 | 5.00 | 5.00 | 5.00 |
| | Speedcure TPO | 5.00 | 5.00 | 5.00 | 5.00 | 5.00 |
| PIGMENT FOR ORANGE INK COMPOSITION | PIGMENT ORANGE 43 | — | — | — | — | — |
| | PIGMENT ORANGE 71 | — | — | — | — | — |
| | PIGMENT ORANGE 73 | — | — | — | — | — |
| | PIGMENT ORANGE 64 | — | — | — | — | — |
| PIGMENT FOR RED INK COMPOSITION | PIGMENT RED 254 | 3.00 | 3.00 | — | — | — |
| | PIGMENT RED 255 | — | — | 3.00 | — | — |
| | PIGMENT RED 179 | — | — | — | 3.00 | — |
| | PIGMENT RED 224 | — | — | — | — | 3.00 |
| DISPERSANT | Solsperse 36000 | 1.20 | 1.20 | 1.20 | 1.20 | 1.20 |
| POLYMERIZATION INHIBITOR | MEHQ | 0.20 | 0.20 | 0.20 | 0.20 | 0.20 |
| | LA-7RD | — | 0.10 | — | — | — |
| SLIPPING AGENT | BYK-UV3500 | 0.50 | 0.50 | 0.50 | 0.50 | 0.50 |
| PHOTOSENSITIZER | Speedcure DETX | 3.00 | 3.00 | 3.00 | 3.00 | 3.00 |
| TOTAL | | 100.00 | 100.00 | 100.00 | 100.00 | 100.00 |

TABLE 3

| COMPONENT CLASSIFICATION | COMPONENT NAME OR TRADE NAME | C-1 | M-1 | Y-1 | B-1 |
|---|---|---|---|---|---|
| VINYL GROUP-CONTAINING (METH)ACRYLATE OF FORMULA (1) | VEEA | 20.00 | 20.00 | 20.00 | 20.00 |
| MONOFUNCTIONAL (METH)ACRYLATE | PEA | 34.60 | 32.40 | 34.10 | 34.10 |
| POLYFUNCTIONAL MONOMER | DPGDA | 30.00 | 30.00 | 30.00 | 30.00 |

TABLE 3-continued

| COMPONENT CLASSIFICATION | COMPONENT NAME OR TRADE NAME | C-1 | M-1 | Y-1 | B-1 |
|---|---|---|---|---|---|
| PHOTOPOLYMERIZATION INITIATOR | Omnirad 819 | 5.00 | 5.00 | 5.00 | 5.00 |
| | Speedcure TPO | 5.00 | 5.00 | 5.00 | 5.00 |
| PIGMENT | PIGMENT BLUE 15:3 | 2.00 | — | — | — |
| | PIGMENT RED 122 | — | 4.00 | — | — |
| | PIGMENT YELLOW 155 | — | — | 2.00 | — |
| | PIGMENT BLACK 7 (CARBON BLACK) | — | — | — | 2.00 |
| DISPERSANT | Solsperse 36000 | 0.20 | 0.40 | 0.20 | 0.20 |
| POLYMERIZATION INHIBITOR | MEHQ | 0.20 | 0.20 | 0.20 | 0.20 |
| SLIPPING AGENT | BYK-UV3500 | 0.50 | 0.50 | 0.50 | 0.50 |
| PHOTOSENSITIZER | Speedcure DETX | 2.50 | 2.50 | 3.00 | 3.00 |
| TOTAL | | 100.00 | 100.00 | 100.00 | 100.00 |

The details of the abbreviations and trade names used in Tables 2 and 3 are as described below.

Vinyl Group-Containing (Meth)acrylate of Formula (1)
VEEA: 2-(2-vinyloxyethoxy)ethyl acrylate, manufactured by Nippon Shokubai Co., Ltd.

Monofunctional (Meth)acrylate
PEA: phenoxyethyl acrylate, trade name: Viscoat #192, manufactured by Osaka Organic Chemical Industry Ltd.
DCPA: dicyclopentenyl acrylate, manufactured by Hitachi Chemical Co., Ltd.
IBXA: isobornyl acrylate, manufactured by Osaka Organic Chemical Industry Ltd.

Monofunctional Monomer
ACMO: acryloylmorpholine, manufactured by KJ Chemicals Corp.

Polyfunctional Monomer
DPGDA: dipropylene glycol diacrylate, manufactured by Sartomer.

Photopolymerization Initiator
Omnirad 819: trade name, bis(2,4,6-trimethylbenzoyl)-phenylphosphine oxide, manufactured by IGM RESINS B.V.
Speedcure TPO: trade name, 2,4,6-trimethylbenzoyl diphenylphosphine oxide, manufactured by Lambson Group Ltd.

Dispersant
Solsperse 36000: trade name, manufactured by Lubrizol.

Polymerization Inhibitor
MEHQ: 4-methoxyphenol, manufactured by Kanto Chemical Co., Inc.
LA-7RD: 4-hydroxy-2,2,6,6-tetramethylpiperidinyl-1-oxyl, trade name: ADEKASTAB (registered trademark) LA-7RD, manufactured by ADEKA Corp.

Slipping Agent
BYK-UV3500: trade name, manufactured by BYK Additives & Instruments.

Photosensitizer
Speedcure (registered trademark) DETX: trade name, 2,4-diethylthioxantone, manufactured by Lambson Group Ltd.

7.1 Preparation of Ink

In accordance with the compositions shown in Tables 2 and 3, the inks were prepared. In particular, the pigment functioning as the colorant, the dispersant, and parts of the polymerizable compounds were weighed and then charged in a bead mill dispersion tank. Subsequently, ceramic-made beads having a diameter of 1 mm were also charged in the tank described above, and the mixture thus prepared was dispersed by a bead mill, so that each pigment dispersion liquid in which the pigment was dispersed in the polymerizable compounds was formed.

In addition to the pigment dispersion liquid described above, in a stainless steel-made mixture tank, the remaining polymerizable compounds, the photopolymerization initiator, the photosensitizer, the polymerization inhibitor, and the slipping agent, which were other than those used for the pigment dispersion liquid described above, were charged after weighed. Subsequently, stirring was performed using a mechanical stirrer, so that solid components, such as the photopolymerization initiator, were fully dissolved in the polymerizable compounds. Next, the pigment dispersion liquid described above was weighed and then added to the mixture described above, and in an environment at approximately 20° C., stirring was further performed for one hour. Subsequently, filtration was performed using a 5-μm membrane filter, so that each ink was obtained.

For the orange ink composition O-1, VEEA was used as the vinyl group-containing (meth)acrylate of the formula (1), PEA was used as the monofunctional (meth)acrylate, DPGDA was used as the polyfunctional monomer, and as the colorant, C.I. Pigment Orange 43 was used.

For the orange ink composition O-2, the amount of VEEA was decreased as compared to that of the orange ink composition O-1, DCPA and IBXA were used besides PEA as the monofunctional (meth)acrylate, ACMO was used as the monofunctional monomer, the polyfunctional monomer was not used, and as the polymerization inhibitor, MEHQ and LA-7RD were used in combination.

For the orange ink composition O-3, compared to the orange ink composition O-1, the colorant was changed to C.I. Pigment Orange 71.

For the orange ink composition O-4, compared to the orange ink composition O-1, the colorant was changed to C.I. Pigment Orange 73.

For the orange ink composition O-5, compared to the orange ink composition O-1, the colorant was changed to C.I. Pigment Orange 64. In addition, C.I. Pigment Orange 64 was a benzimidazolone-based pigment.

For the red ink composition R-1, compared to the orange ink composition O-1, the same polymerizable compounds were used, and the colorant was changed to C.I. Pigment Red 254.

For the red ink composition R-2, the amount of VEEA was decreased as compared to that of the red ink composition R-1, DCPA and IBXA were used in combination with PEA as the monofunctional (meth)acrylate, ACMO was used as the monofunctional monomer, the polyfunctional monomer was not used, and as the polymerization inhibitor, MEHQ and LA-7RD were used in combination.

For the red ink composition R-3, compared to the red ink composition R-1, the colorant was changed to C.I. Pigment Red 255.

For the red ink composition R-4, compared to the red ink composition R-1, the colorant was changed to C.I. Pigment Red 179.

For the red ink composition R-5, compared to the red ink composition R-1, the colorant was changed to C.I. Pigment Red 224.

7.2. Formation of Evaluation Printed Matter

The inks thus prepared were printed by ink combination as shown in Table 4, so that evaluation printed matters of Examples 1 to 9 and Comparative Examples 1 and 2 were formed. Table 4 is a table showing the combinations of the inks used for the printed matters of Examples and Comparative Examples and the evaluation results of the evaluation printed matters formed by the combinations described above. Hereinafter, Examples 1 to 9 are collectively called Examples in some cases, and Comparative Examples 1 and 2 are collectively called Comparative Examples in some cases.

First, in accordance with the ink combinations shown in Table 4, the evaluation printed matters of Examples and Comparative Examples were formed. In particular, as a recording medium, a PET film, Lumirror E20 (thickness: 100 μm), manufactured by Toray Industries, Inc. was used. As an ink jet apparatus, an ink jet printer, PX-G930, manufactured by Seiko Epson Corporation was used. The printer described above was modified to use a plastic film as a recording medium and to eject an ultraviolet curable ink.

In printed patterns of the evaluation printed matters of Examples and Comparative Examples, the individual inks were used in an arbitrary ratio, 10-mm square patch patterns regularly disposed were used, and the recording resolution was set to 720 dpi (dots per inch) in a lateral direction and 720 dpi in a longitudinal direction. In addition, a liquid layer of the ink on the recording medium was irradiated with ultraviolet rays emitted from an UV-LED at a radiation energy of 300 mJ/cm$^2$, so that a cured coating film was formed. Accordingly, the evaluation printed matters of Examples and Comparative Examples were obtained.

In Examples 1 to 8, the orange ink composition and the red ink composition used for the printing each contained one of a perinone-based pigment, a perylene-based pigment, and a diketopyrrolopyrrole-based pigment. In Example 9, the orange ink composition used for the printing contained neither a perinone-based pigment, a perylene-based pigment, nor a diketopyrrolopyrrole-based pigment. In Comparative Example 1, the red ink composition was not used for the printing. In Comparative Example 2, the orange ink composition was not used for the printing.

7.3. Evaluation of Evaluation Printed Matter 7.3.1. Light Resistance

The light resistance of the evaluation printed matter of each of Examples and Comparative Examples was evaluated. In particular, a sample piece for a light resistant test was formed from each evaluation printed matter. Subsequently, by using a colorimeter, OD (optical density) values of a yellow color component and a magenta color component of each sample piece were measured and were each regarded as an initial OD value. As the colorimeter, Spectrolino manufactured by X-Rite was used, and as the measurement conditions, a light source D65 was used, and a viewing angle was set to 2°.

Next, an accelerating weathering test was performed on the sample piece described above until a cumulative emission light amount reached 92 MJ/m$^2$. Subsequently, after the test described above was performed, the OD value of each test piece was measured by the method described above and was regarded as the OD value after the test. A rate of the OD value after the test to the initial OD value was calculated, and a remaining rate of the OD value was calculated. The remaining rate of the OD value was evaluated in accordance with the following evaluation criteria, and the result thereof is shown in Table 4.

Evaluation Criteria

AA: Remaining rate of OD value is 80% or more.
A: Remaining rate of OD value is 70% to less than 80%.
B: Remaining rate of OD value is 50% to less than 70%.
C: Remaining OD value is less than 50%.

7.3.2. Color Reproducibility

As for the evaluation printed matters of Examples and Comparative Examples, the color reproducibility in a warm color hue was evaluated. In particular, in a printed region of the evaluation printed matter in which a* and b* were positive values, a* and b* were measured. a* and b* were measured by a colorimeter, Spectrolino, manufactured by X-RITE under conditions in which the light source filter was not used, D65 was used as the light source, and the viewing angle was set to 2°. a* and b* thus obtained were evaluated in accordance with the following evaluation criteria, and the results thereof are shown in Table 4.

Evaluation Criteria

A: a* is 70 or more, and b* is 70 or more.
B: a* is 60 to less than 70, and b* is 60 to less than 70.
C: a* is less than 60, and b* is less than 60.

TABLE 4

| | | EXAMPLE 1 | EXAMPLE 2 | EXAMPLE 3 | EXAMPLE 4 | EXAMPLE 5 | EXAMPLE 6 |
|---|---|---|---|---|---|---|---|
| INK COMBINATION | ORANGE INK COMPOSITION | O-1 | O-2 | O-1 | O-3 | O-4 | O-1 |
| | RED INK COMPOSITION | R-1 | R-1 | R-2 | R-1 | R-1 | R-3 |
| | CYAN INK COMPOSITION | C-1 | C-1 | C-1 | C-1 | C-1 | C-1 |
| | MAGENTA INK COMPOSITION | M-1 | M-1 | M-1 | M-1 | M-1 | M-1 |
| | YELLOW INK COMPOSITION | Y-1 | Y-1 | Y-1 | Y-1 | Y-1 | Y-1 |

TABLE 4-continued

| | | | | | | | |
|---|---|---|---|---|---|---|---|
| EVALUATION RESULT | BLACK INK COMPOSITION | B-1 | B-1 | B-1 | B-1 | B-1 | B-1 |
| | LIGHT RESISTANCE | AA | AA | AA | A | B | B |
| | COLOR REPRODUCIBILITY | A | A | A | B | B | B |

| | | EXAMPLE 7 | EXAMPLE 8 | EXAMPLE 9 | COMPARATIVE EXAMPLE 1 | COMPARATIVE EXAMPLE 2 |
|---|---|---|---|---|---|---|
| INK COMBINATION | ORANGE INK COMPOSITION | O-1 | O-1 | O-5 | O-5 | — |
| | RED INK COMPOSITION | R-4 | R-5 | R-1 | — | R-1 |
| | CYAN INK COMPOSITION | C-1 | C-1 | C-1 | C-1 | C-1 |
| | MAGENTA INK COMPOSITION | M-1 | M-1 | M-1 | M-1 | M-1 |
| | YELLOW INK COMPOSITION | Y-1 | Y-1 | Y-1 | Y-1 | Y-1 |
| | BLACK INK COMPOSITION | B-1 | B-1 | B-1 | B-1 | B-1 |
| EVALUATION RESULT | LIGHT RESISTANCE | B | B | C | C | A |
| | COLOR REPRODUCIBILITY | B | B | B | C | C |

7.3.3. Conclusion of Evaluation Results

As shown in Table 4, in all Examples, the color reproducibility was evaluated as B corresponding to "Acceptable" or higher. In particular, in Examples 1, 2, and 3 in each of which C.I. Pigment Orange 43 was used for the orange ink composition, and C.I. Pigment Red 254 was used for the red ink composition, the color reproducibility was evaluated as A corresponding to "Good".

The evaluation results of the light resistance of Examples other than Example 9 were B corresponding to "Acceptable" or more. In particular, in Examples 1, 2, and 3, the evaluation results of the light resistance were AA corresponding to "Excellent", and in Example 4, the evaluation result was A corresponding to "Good".

From the results described above, it was shown that the color reproducibility in the warm color hue was improved in each Example. In addition, it was also shown that in many Examples, the light resistance was also "Good".

On the other hand, in Comparative Examples 1 and 2, the color reproducibility was evaluated as C corresponding to "Bad", and it was found that in the inks of Comparative Examples, the color reproducibility in the warm color hue was inferior. In addition, in Comparative Examples 1 in which a benzimidazolone-based pigment was used for the orange ink composition, the light resistance was evaluated as C corresponding to "Bad".

What is claimed is:

1. An ink jet method comprising:
adhering a plurality of ink jet compositions containing colorants and polymerizable compounds to be cured with radioactive rays to a recording medium during one printing operation,
wherein the plurality of ink jet compositions include at least an orange ink composition and a red ink composition, and
the one printing operation includes supplying a recording medium to a printer, forming a printed matter on the recording medium by depositing each of the orange ink composition and the red ink composition to the record no medium and then curing each of the orange ink composition and the red ink composition on the recording medium, and then removing the printed matter from the printer.

2. The ink jet method according to claim 1, wherein the orange ink composition and the red ink composition contain, as the colorant, one of a perinone-based pigment, a perylene-based pigment, and a diketopyrrolopyrrole-based pigment.

3. The ink jet method according to claim 2, wherein the orange ink composition contains, as the colorant, one of C.I. Pigment Orange 43, 71, and 73.

4. The ink jet method according to claim 2, wherein the red ink composition contains, as the colorant, one of C.I. Pigment Red 179, 224, 254, and 255.

5. The ink jet method according to claim 1, wherein the polymerizable compounds include a vinyl group-containing (meth)acrylate represented by the following formula (1), $$H_2C=CR^1-CO-OR^2-O-CH=CH-R^3 \quad (1)$$

where $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

6. The ink jet method according to claim 1, wherein the polymerizable compounds include a monofunctional (meth)acrylate in an amount of 25 percent by mass or more with respect to a total mass of the ink jet compositions.

7. The ink jet method according to claim 1, wherein the recording medium contains one of a poly(vinyl chloride), a poly(ethylene terephthalate), a polyolefin, a nylon, a polycarbonate, and a metal.

8. The ink jet method according to claim 1, wherein the ink jet compositions include a cyan ink composition, a magenta ink composition, a yellow ink composition, and a black ink composition.

9. The ink jet method according to claim 8, wherein the yellow ink composition contains, as the colorant, one of C.I. Pigment Yellow 150, 155, 180, and 185.

10. The ink jet method according to claim 8, wherein the magenta ink composition contains, as the colorant, one of C.I. Pigment Red 57:1 and 122 and C.I. Pigment Violet 19.

11. An ink jet apparatus comprising:
an ink jet head to configured to eject a plurality of ink jet compositions containing colorants and polymerizable compounds to be cured with radioactive rays; and
a light source adjacent to the ink jet head that is configured to emit the radioactive rays to cure the polymerizable compounds of each of the plurality of ink jet compositions,
wherein the ink jet compositions include at least an orange ink composition and a red ink composition, and
the ink jet head is configured to eject the plurality of ink jet compositions to a recording medium during one printing operation,
wherein the one printing operation includes supplying a recording medium to a printer, forming a printed matter on the recording medium by depositing each of the orange ink composition and the red ink composition to the recording medium using the ink jet head, and then curing each of the orange ink composition and the red ink composition on the recording medium using the light source, and then removing the printed matter from the printer.

12. The ink jet method according to claim 1, wherein the one printing operation excludes re-supplying the recording medium including the printed matter to the printer, and forming another printed matter on the recording medium.

\* \* \* \* \*